(12) United States Patent
Kun et al.

(10) Patent No.: US 9,060,192 B2
(45) Date of Patent: Jun. 16, 2015

(54) METHOD OF AND A SYSTEM FOR PROVIDING BUFFER MANAGEMENT MECHANISM

(75) Inventors: Chen Kun, Shanghai (CN); Ling Jie, Shanghai (CN); Tang Wenhu, Shanghai (CN); Jinyang Xie, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 925 days.

(21) Appl. No.: 13/262,881

(22) PCT Filed: Apr. 16, 2009

(86) PCT No.: PCT/CN2009/000404
§ 371 (c)(1),
(2), (4) Date: Oct. 4, 2011

(87) PCT Pub. No.: WO2010/118556
PCT Pub. Date: Oct. 21, 2010

(65) Prior Publication Data
US 2012/0030722 A1     Feb. 2, 2012

(51) Int. Cl.
*G06F 12/00*     (2006.01)
*H04N 7/10*     (2006.01)
(Continued)

(52) U.S. Cl.
CPC ..... *H04N 21/2408* (2013.01); *H04N 21/23406* (2013.01); *H04N 21/23106* (2013.01); *H04N 21/23113* (2013.01); *H04N 21/8456* (2013.01)

(58) Field of Classification Search
CPC .................. H04N 21/23406; H04N 21/23106; H04N 21/2408; H04N 21/23113
USPC ..................................... 725/93–94
See application file for complete search history.

(56) References Cited

U.S. PATENT DOCUMENTS 5,461,415 A * 10/1995 Wolf et al. .................. 725/88
6,138,221 A * 10/2000 Korst et al. .................. 711/167
(Continued)

FOREIGN PATENT DOCUMENTS

CN     1914844 A     2/2007
CN     101356777 A     1/2009
(Continued)

OTHER PUBLICATIONS

International Search Report for PCT/CN2009/000404, mailed Jan. 28, 2010.

*Primary Examiner* — Benjamin R Bruckart
*Assistant Examiner* — Carmine Malangone
(74) *Attorney, Agent, or Firm* — Baker Botts, LLP

(57) ABSTRACT

The present invention provides a method of and a system for providing buffer management mechanism in an on-Demand environment to keep the popular content sections in server memory so as to reduce the repeatable disk I/O and improve the server performance. The method comprises: setting the state of a buffer to be ACTIVE when a file section stored in the buffer is requested by any users; setting the state of the buffer to be INACTIVE when users no longer request the file section stored in the buffer, the buffer in INACTIVE state having a lifetime; changing the state of the buffer from INACTIVE to FREE when the lifetime decreases to zero. The system comprises at least one detector for detecting the number of the users requesting a file section stored in the buffer and providing the detection results for a processor, one processor for determining the state of the buffer according to the detection results and providing instructions for at least one state setting unit, and at least one state setting unit for setting the state of the buffer based on instructions from the processor.

21 Claims, 4 Drawing Sheets

(51) Int. Cl.
*H04N 7/16* (2011.01)
*H04N 21/24* (2011.01)
*H04N 21/234* (2011.01)
*H04N 21/231* (2011.01)
*H04N 21/845* (2011.01)

(56) References Cited

U.S. PATENT DOCUMENTS 7,631,239 B2    12/2009  Yeo et al.
2004/0128346 A1*  7/2004  Melamed et al. ............. 709/203
2004/0179523 A1*  9/2004  Maruyama et al. ........... 370/389
2007/0140282 A1   6/2007  Lakshmanamurthy et al.
2008/0155059 A1*  6/2008  Hardin et al. ................ 709/218
2008/0320222 A1* 12/2008  Dhodapkar .................. 711/118

FOREIGN PATENT DOCUMENTS

EP        0 739 136 A2    10/1996
WO    WO 2008/024037 A1   2/2008

* cited by examiner

METHOD OF AND A SYSTEM FOR PROVIDING BUFFER MANAGEMENT MECHANISM

This application is the U.S. national phase of International Application No. PCT/CN2009/000404 filed 16 Apr. 2009 which designated the U.S., the entire content of which is hereby incorporated by reference.

TECHNICAL FIELD

The present invention relates to the field of streaming media technology. In particular, the present invention relates to a method of and a system for providing buffer management mechanism in an on-Demand environment.

BACKGROUND

With the advent of digital media technology, it is feasible to provide on-Demand services such as Video-on-Demand (VoD) service to a large number of clients over a geographically distributed network. To guarantee continuous delivery of a video stream to the client, a streaming server is used for storing the resources.

A video streaming server is a device that is capable of streaming hundreds to thousands of video streams to Set Top Boxes or mobile terminal at customer premises. The content itself may reside on CD's, conventional rotating disks, flash disks or even RAM. The most used storage today is conventional disks because of its low price per data volume. In Video-on-Demand application a popular content can be streamed by many users during a hot period.

The requirement for the server, especially for disk I/O, can be very high since there are a large number of users. Streaming thousands of streams concurrently performs lots of disk I/O and network I/O, and introduces a huge CPU usage. Traditional buffer management policies employed by various software systems are based upon the concept of a "hot set" of data, which is not suitable for the Video-on-Demand environment.

To minimize the CPU usage direct I/O is applicable in most operating systems for the applications performing lot of disk I/O. Using direct I/O means application will bypass the operating system cache; so, it is very important to introduce an application level cache so as to reduce the repeatable disk I/O of hot contents and improve the VoD application performance.

In most VOD applications, the input and output of the disk are the bottleneck for the media streaming. To overcome this problem, a kind of mechanism named buffer cache mechanism is introduced by those skilled in the art to improve the performance of the streaming server. Currently a general content buffer reusage mechanism is adopted by most VoD streaming servers. In this mechanism, generally, only one piece of the content will be loaded from the conventional disk each time as per the user's requirement. However, the size of whole VoD file is usually too large for the server to load to the server memory. Hence, one VoD file is usually divided into a plurality of sections and is stored in the VoD content storage in form of sections. After one content section is loaded to one buffer memory, this section can be streamed to any users who require this content section. When this section is no more requested by any users, this section will be cleared and this buffer memory may be re-flushed with another section. However, there are problems with the above illustrated solutions. Mainly, there are some drawbacks as listed below in the buffer mechanism in the existing VoD application solutions.

For VoD applications, there is a statistical rule that 80 percentages of all the end users will watch the 20 percentage hot contents during a period of time. According to the current solutions, one hot content section will be released and will be no more stored in the server memory, when no user needs it. However, this hot content may be required soon after it is released since this content section is very popular. This will result in the repeatable disk I/O for the same content section, which will be still high during a period of time.

According one aspect of the existing solution, all the buffers will be released and all of the content sections will be cleared when the application server has no workload during the idle time. If the server meets the high traffic again, all of the content sections need to be reloaded from the disk, which brings heavier burden for the server.

Accordingly, it would be desirable to provide a method and a system for providing an efficient buffer management mechanism in an on-Demand environment to overcome the above disadvantages.

SUMMARY

Therefore, it is one object of the present invention to address the above disadvantages by providing a method of and a system in an on-Demand environment for providing buffer management mechanism in TV solution to keep the popular content sections in server memory so as to reduce the repeatable disk I/O and improve the server performance.

According to one aspect of the invention, there is provided a method of managing buffers configured in a streaming server in an on-Demand environment, wherein a plurality of buffers are allocated in a memory pool of the streaming server to store sections of on-Demand files, the method comprising: setting the state of a buffer to be ACTIVE when a file section stored in the buffer is requested by any users; setting the state of the buffer to be INACTIVE when users no longer request the file section stored in the buffer, the buffer in INACTIVE state having a lifetime; changing the state of the buffer from INACTIVE to FREE when the lifetime decreases to zero.

According to one aspect of the above described embodiment, wherein the file section in the buffer is not releasable when the buffer is in a state of ACTIVE or INACTIVE, and the file section in the buffer is releasable when the buffer is in a state of FREE.

According to one aspect of the above described embodiments, wherein the buffer in INACTIVE state can be recalled by any users requesting the file section stored in this buffer; and the buffer in Free State can be refilled with any file sections when being requested.

According to one aspect of the above described embodiments, wherein the lifetime pauses immediately when the state of this buffer is changed from INACTIVE to ACTIVE and remains unchangeable during the buffer being in ACTIVE state.

According to one aspect of the above described embodiments, wherein the lifetime decreases by a predetermined time td per interval ts during the buffer being in INCATIVE state.

According to one aspect of the above described embodiments, wherein time td and the interval ts are determined according to the size of the file section, the size of the memory pool and the popularity of the content contained in the file section.

According to one aspect of the above described embodiments, wherein the lifetime of the buffer storing the file section of the on-Demand file is determined according to the following formula at the time when the state of the buffer is changed from ACTIVE to INACTIVE, $$t1=tc+\text{PeakUser}*\text{influence coefficient}*ts$$

wherein t1 represents the lifetime of the buffer, tc represents the current lifetime of the buffer, PeakUser is the total number of users requesting the file section when the buffer is in the state of ACTIVE, influence coefficient is the number of the sections following the first file section, ts is the interval to decrease t1.

According to one aspect of the above described embodiments, wherein the lifetime of one referred buffer storing one referred file section following the section in the on-Demand file is determined according to the following formula at the time when the state of the buffer storing the file section is changed from ACTIVE to INACTIVE, $$tln=tcn+\text{PeakUser}*(\text{influence coefficient}-n)*ts$$

wherein t1n represents the lifetime of the referred buffer, tcn represents the current lifetime of the referred buffer, n is the distance between the file section and the referred file section, wherein 0<n<influence coefficient−1.

According to one aspect of the above described embodiments, wherein the value of PeakUser is set to be zero when the state of the buffer is changed from ACTIVE to INACTIVE.

According to one aspect of the above described embodiments, wherein the lifetime of the buffer is assigned to tc when the state of the buffer is changed from INACTIVE to ACTIVE.

According to one aspect of the above described embodiments, wherein the lifetime tln of the referred buffer is added to the current lifetime tcn when the state of the referred buffer is changed from ACTIVE to INACTIVE.

According to another aspect of the invention, there is provided a system for managing buffers configured in a streaming server in an on-Demand environment, wherein a plurality of buffers are allocated in a memory pool of the streaming server to store sections of on-Demand files, the system comprising: at least one detector for detecting the number of the users requesting a file section stored in the buffer and providing the detection results for a processor; processor for determining the state of the buffer according to the detection results and providing instructions for at least one state setting unit; at least one state setting unit for setting the state of the buffer based on instructions from the processor, wherein the state setting unit sets the state of the buffer to be ACTIVE when the file section is requested by any users, sets the state of the buffer to be INACTIVE when users no longer request the file section stored in the buffer, and changes the state of the buffer from INACTIVE to FREE when the lifetime of the buffer in INACTIVE state decreases to zero.

According to one aspect of the above described embodiments, wherein a buffer data information memory is configured in each buffer to keep the information about the value of current users as well as the lifetime of buffer in INACTIVE state, the value of the current users being detected by the detector when the detector detects the number of the users requesting a file section stored in the buffer.

According to one aspect of the above described embodiments, wherein the processor determines that the file section in the buffer is not releasable if the buffer is in a state of ACTIVE or INACTIVE, and the processor determines that the file section in the buffer is releasable if the buffer is in a state of FREE.

According to one aspect of the above described embodiments, wherein the processor determines that the buffer in INACTIVE state can be recalled by any users requesting the file section stored in this buffer; and the processor determines the buffer in the state of FREE can be refilled with any file sections when being requested.

According to one aspect of the above described embodiments, wherein the lifetime pauses immediately when the state setting unit changes the state of this buffer from INACTIVE to ACTIVE and the state of this buffer remains unchangeable during the buffer being in ACTIVE state.

According to one aspect of the above described embodiment, wherein the system further comprises a timer connected with the memory pool for the purpose of decreasing the lifetime by a predetermined time td per interval ts during the buffer being in INCATIVE state.

the lifetime decreases by a predetermined time td per interval ts during the buffer being in INCATIVE state.

According to one aspect of the above described embodiment, wherein the processor determines time td and the interval ts according to the size of the file section, the size of the memory pool and the popularity of the content contained in the file section.

According to one aspect of the above described embodiment, wherein the processor determines lifetime of the buffer storing the file section of the on-Demand file according to the following formula at the time when the state setting unit changes the state of the buffer from ACTIVE to INACTIVE, $$t1=tc+\text{PeakUser}*\text{influence coefficient}*ts$$

wherein t1 represents the lifetime of the buffer, tc represents the current lifetime of the buffer, PeakUser is the total number of users requesting the file section when the buffer is in the state of ACTIVE, influence coefficient is the number of the sections following the first file section, ts is the interval to decrease t1.

According to one aspect of the above described embodiment, wherein the processor determines the lifetime of one referred buffer storing one referred file section (01n) following the section in the on-Demand file according to the following formula at the time when the state setting unit changes the state of the buffer storing the file section from ACTIVE to INACTIVE, $$tln=tcn+\text{PeakUser}*(\text{influence coefficient}-n)*ts$$

wherein t1n represents the lifetime of the referred buffer, tcn represents the current lifetime of the referred buffer, n is the distance between the file section and the referred file section (01n), wherein 0<n<influence coefficient−1.

According to one aspect of the above described embodiment, wherein the value of PeakUser decreases to zero when the state setting unit changes the state of the buffer from ACTIVE to INACTIVE.

According to one aspect of the above described embodiment, wherein the processor assigns the lifetime of the buffer to tc when the state setting unit changes the state of the buffer from INACTIVE to ACTIVE.

According to one aspect of the above described embodiment, wherein the current lifetime tc0 is zero when the state setting unit changes the state of the buffer from ACTIVE to INACTIVE for the first time.

According to yet another aspect of the invention there is provided a streaming server for providing buffer management mechanism comprising a system as defined in the above embodiments.

According to yet another aspect of the invention there is provided a communication system for providing on-Demand services over a communication network comprising a content storage for storing on-Demand files and a streaming server as defined as described above.

According to yet another aspect of the invention there is provided a computer readable medium including logic for managing buffers configured in a streaming server in an on-Demand environment, wherein a plurality of buffers are allocated in a memory pool of the streaming server to store sections of on-Demand files, the logic operable to: set the state of a buffer to be ACTIVE when a file section stored in the buffer is requested by any users; set the state of the buffer to be INACTIVE when users no longer request the file section stored in the buffer, the buffer in INACTIVE state being configured with a lifetime $t_1$; change the state of the buffer from INACTIVE to FREE when the lifetime $t_1$ decreases to zero.

According to the method and system as described above, it could be easily understood that the repeatable I/O read has been avoided and the server performance has been greatly enhanced by providing the following improvement:

When all the users finished streaming one popular VoD file section, the VoD file section will not removed immediately from the memory. The forecasting mechanism is used to calculate the lifetime of the VoD file section. The VoD file section is required by more concurrent users and the lifetime will be longer than others. During the life time when new user needs streaming the section, it can immediately be served without loading it from the storage.

The lifetime influence coefficient is introduced to prolong the lifetime of the following VoD file sections to prevent following sections are removed before the end users stream them.

When the streaming server is in idle status, its memory pool still remains the popular VoD file sections to reduce the I/O read when the sever be busy again.

The server can give the figure of popular contents status at any runtime according to the VoD content sections lifetime.

BRIEF DESCRIPTION OF THE DRAWINGS

The above and other aspects, features, and advantages of the present invention will be more apparent from the following more particular description thereof, presented in conjunction with the accompanying drawings, in which.

Corresponding reference characters indicate corresponding components throughout the several views of the drawings.

DETAILED DESCRIPTION

As discussed above, the existing solution does not take into consideration how to prolong the reusage possibility of popular VoD content sections. Furthermore, the existing solution does not utilize the relationship between the current content section and the other content sections, especially the sections following the current section. To be specific, if one section of one content is very hot, the following sections can also be popular. In this regard, there is a need for providing a well defined forecasting mechanism, which can be applied for VoD application.

However, how to perform the dynamical optimization for the reusage of the popular VoD contents so as to decrease the I/O read of streaming server is always a challenging issue for those skilled in the art. The embodiments below provide solutions to address the above depicted technical issues.

The embodiments set forth below represent the necessary information to enable those skilled in the art to practice the invention and illustrate the best mode of the practicing the invention. Upon reading the following description in light of the accompanying drawing figures, those skilled in the art should understand the concepts of the invention and will recognize applications of these concepts not particularly addressed herein.

The method and system according to the invention can be not only used in Video-on-Demand service, but also employed in other Multimedia-on-Demand service. In the description below, the method and system of the present invention is illustrated in a VoD environment, however, those skilled in the art can understand that any other on-Demand services adopting the method and/or system according to the present invention fall within the scope of the disclosure and the accompanying claims.

Throughout the description and claims of this specification, the terminology "STB" includes, but is not limited to, the Set Top Box; term "RAM" includes but is not limited to Random Access Memory; term "CD" includes but is not limited to Compact Disk; term "VoD" includes but is not limited to Video-on-Demand; term "MT" includes but is not limited to Mobile Terminal.

As is known for those skilled in the art, a VoD file is stored in the VoD content storage with time-line frames order. For ease of management and furthermore, for ease of transmission, as provided in the prior art, a VoD file is logically divided to a plurality of consecutive content sections, each content section corresponding to each part of the VoD file and being configured with a fixed size. This partition naming index file can be generated using an offline tool and be stored in the storage with the VoD file. In one embodiment of the invention, as is indicated in FIG. 1, VoD file 201 is stored in VoD content storage 200 in term of content sections, for example, section 0 to section n, each corresponding to one item of the vodindexmap.

Figure 1:
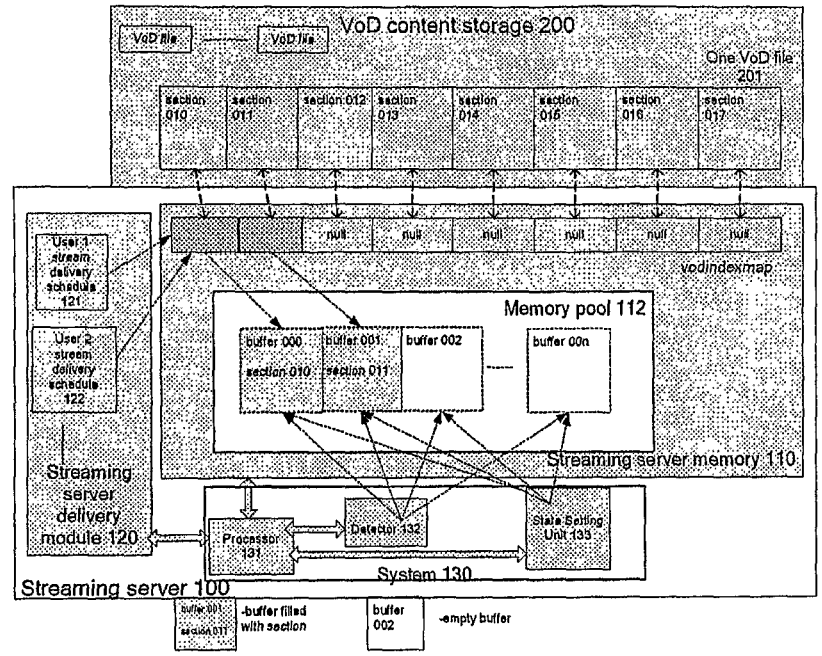
FIG. 1 is a schematic view illustrating a simplified system architecture of an on-Demand system.

Referring to FIG. 1, when a user (not shown) files a request on streaming VoD file 201 with the streaming server 100 through a communication network (not shown), streaming server 100 tries to find and locate VoD file 201 stored in the VoD content storage 200. Then the structure VoD index map in the VoD application will load the VoD index file, wherein each element in the VoD index map describes the information about the VoD content section:

the section related stream frames' start time and stop time;
the section relative location in the VoD file;
the buffer pointer which load the section from the disk; the pointer is null from the beginning since the real section will not be loaded until any user needs streaming the section.

Generally, when one section of VoD file 201 is requested, server 100 will borrow a buffer from memory pool 112 to load the requested section from video content storage 200; then streaming delivery module 120 will deliver the section being requested to the end user, wherein each user can be arranged with a stream delivery schedule.

To be specific, as is shown in FIG. 1, VoD file 201 and its index file vodindexmap will be opened when the first user requests it. If there is more than one user requesting the same VoD content concurrently, the users will share the same VoD index map and the same buffer containing the requested content section.

When streaming server 100 starts to stream a requested content section, for example, section 0, memory pool 112 with configurable size will be set up in server 100 for later storing VoD sections. On the other hand, a plurality of buffers such as 000 to 00n are allocated in memory pool 112 of streaming server 100 for further storing the requested sections of VoD file 201.

Here, according to one preferred embodiment of the invention, there is provided a management mechanism for managing these buffers in the pool.

Figure 2:
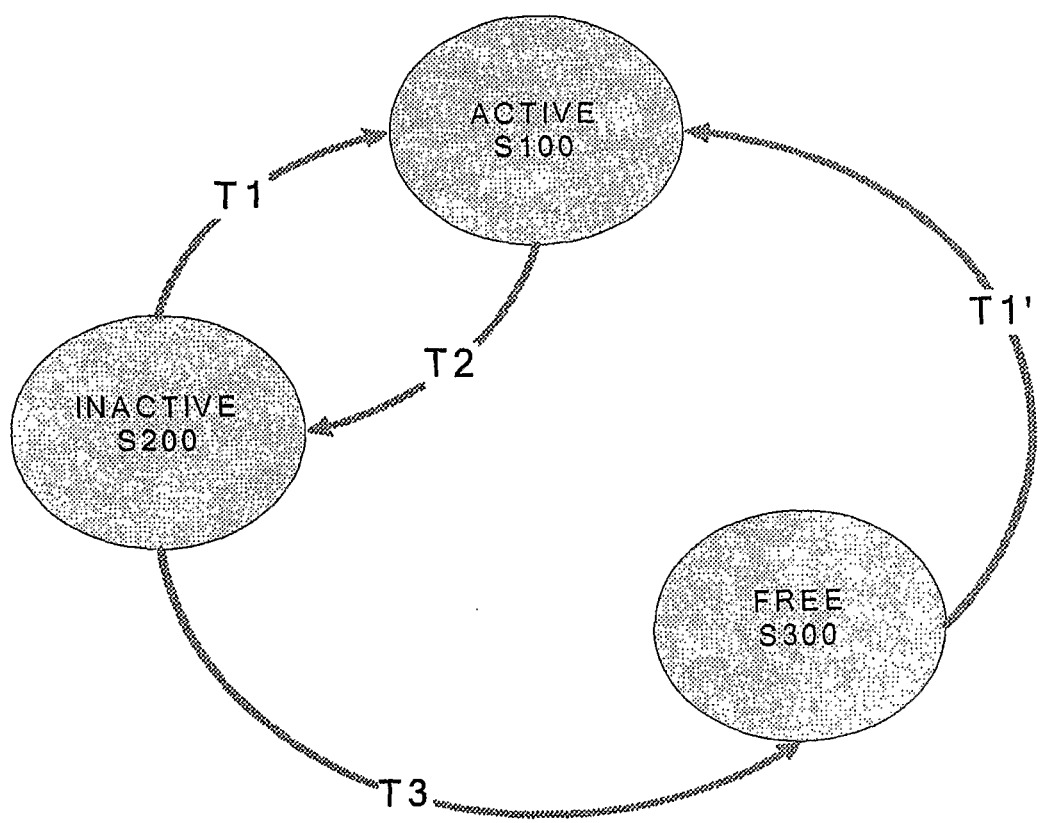
FIG. 2 is a flow chart showing the transform between different states of the buffer according to one embodiment of the present invention.

To be specific, the buffers can be configured with different states, as is shown in FIG. 2. The different states of the buffers 000, 001, ..., 00n in memory pool 112 are defined as follows:

ACTIVE S100 means the file section stored in the buffer is being requesting by users;

INACTIVE S200 means users no longer request the file section stored in the buffer, but the buffer still has a lifetime, which is not equal to zero;

FREE S300 means there is no content section in the buffer or the buffer containing one content section but the lifetime of the buffer is zero.

Taking buffer 000 and section 010 for example, when there is no content section in buffer 000, the state of buffer 000 is FREE S300; when content section 010 is requested by one user, this section will be loaded into buffer 000 and the state of buffer 000 is changed from Free S300 to ACTIVE S100, as is illustrated in step T1'. When users do not request content section 010 any more, the state of buffer 000 is changed from ACTIVE S100 to INACTIVE S200, as is shown in step T2, and meanwhile buffer 000 is configured with a lifetime. When section 010 in buffer 000 in INACTIVE state S200 is requested by one user again, the state of buffer 000 is changed back to ACTIVE S100. This is indicated in step T1. When the lifetime of buffer 000, which is in the state of INACTIVE S200, decreases to zero, the state of buffer 000 is changed from INACTIVE S200 to FREE S300, which is shown in step T3. That means, inactive buffer 000 with life time being zero can be re-filled with a new VoD section and can be moved to the state of ACTIVE S100 if any users want to load a new VoD section that has not been loaded into memory pool 112.

It should be understood that in the embodiment as shown in FIG. 2, file section 010 in buffer 000 is not releasable when buffer 000 is in a state of ACTIVE S100 or INACTIVE S200, and file section 010 in buffer 000 is releasable when the buffer 000 is in a state of FREE S300. Buffer 000 in INACTIVE S200 state can be recalled by any users requesting the file section 010 stored in this buffer 000; and the buffer 000 in FREE S300 state can be refilled with any file sections when being requested.

According to the afore-described embodiment, when content section 010 in buffer 000 is no more requested by any users, content section 010 in buffer 000 will not be cleared immediately. Instead, buffer 000 will be logically moved to a list naming buffers with sections in inactive state with a life time greater than 0. The inactive buffers are managed with global timer 134.

Figure 3:
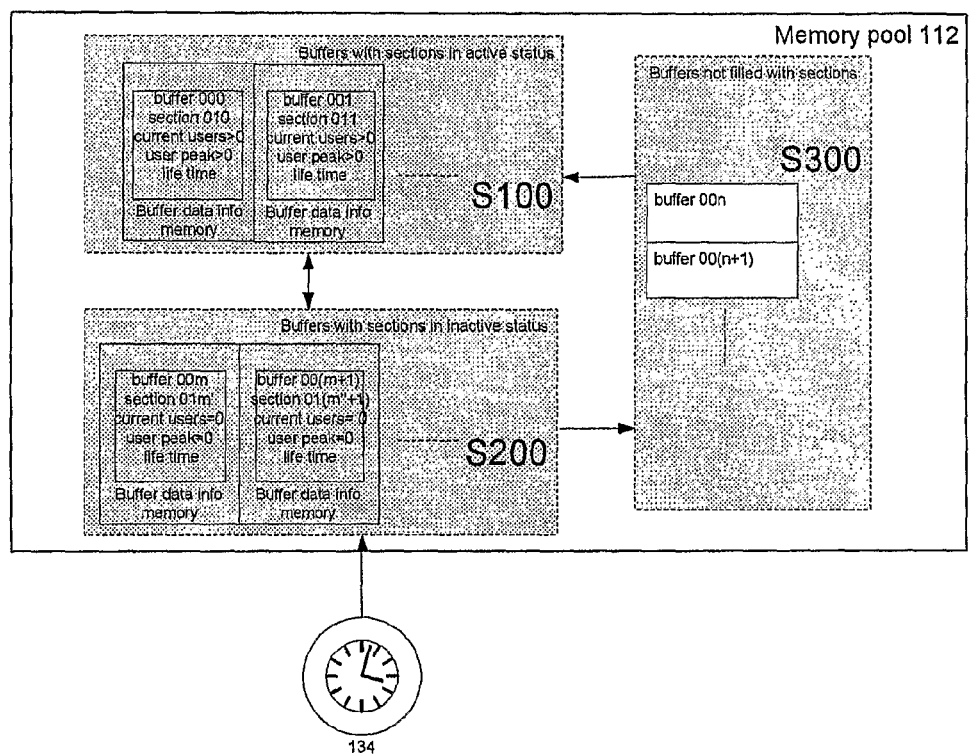
FIG. 3 is diagram showing the detailed transformation as illustrated in FIG. 2.

FIG. 3 indicates a more detailed description of the above illustrated embodiment. There is provided a buffer data information memory in each buffer to store the parameters regarding the state of each buffer. For example, these parameters can be the number of the users requesting the content section 010 currently, the user peak that means the total number of users requesting the content section 010, the current lifetime of buffer, and so on. When buffer 000 storing section 010 is in the state of ACTIVE S100, the number of the current users should be greater than zero, the total number of the users should also be greater than zero. When the state of buffer 000 turns from ACTIVE S100 to INACTIVE S200, the number of current users as well as the user peak is changed to be zero. On the other hand, the lifetime of this buffer will be calculated on the basis of these parameters, as further illustrated below. The lifetime is managed by timer 134. Timer 134 is connected with the memory pool 112 for the purpose of decreasing the lifetime by a predetermined time td per interval ts during the buffer being in INCATIVE state. To be specific, when timer 134 expires, the lifetime will be reduced by a value. When the lifetime decreases to zero, then state S200 will be changed to be FREE S300. When the buffer is in the state of S300, there is no parameter in the buffer data information memory. State of either S200 OR S300 can be changed to be S100 when buffer 000 is recalled by any users.

Turning back to FIG. 1, to implement the buffer management mechanism, there is provided a system 130 comprising a processor 131, a detector 132, and a state setting unit 133 in streaming server 100. The detector 132 is used for detecting the number of the users requesting file section 010 stored in buffer 000 and providing detection results for processor 131. Processor 131 is used for determining the state of the buffer 000 according to the detection results and providing instructions for state setting unit 133. State setting unit 133 is configured for setting the state of the buffer 000 based on instructions from the processor 131.

State setting unit 133 sets the state of buffer 000 to be ACTIVE S100 when file section 010 is requested by any users, sets the state of buffer 000 to be INACTIVE S200 when users no longer request file section 010 stored in buffer 000, and changes the state of buffer 000 from INACTIVE S200 to FREE S300 when the lifetime of buffer 000 in INACTIVE state decreases to zero.

Furthermore, a buffer data information memory (not shown) is configured in each buffer (000, 001 . . . ) to keep the information about the value of current users as well as the lifetime of buffer being in INACTIVE state, the value of the current users being detected by detector 132 when detector 132 detects the number of the users requesting file section 010 stored in buffer 000, as mentioned above.

Processor 131 determines that file section 010 in buffer 000 is not releasable if buffer 000 is in a state of ACTIVE S100 or INACTIVE S200, and the processor 131 determines that the file section 010 in buffer 000 is releasable if buffer 000 is in a state of FREE S300. Furthermore, processor 131 determines that file section 010 in buffer 000 is not releasable if buffer 000 is in a state of ACTIVE S100 or INACTIVE S200, and processor 131 determines that file section 010 in buffer 000 is releasable if buffer 000 is in a state of FREE S300. Processor 131 also determines that buffer 000 in INACTIVE S200 state can be recalled by any users requesting file section 010 stored in buffer 000; and processor 131 determines buffer 000 in FREE S300 state can be refilled with any file sections when being requested.

In the above-mentioned embodiment, a new concept "lifetime" is introduced. Mainly, as illustrated above, when the state of buffer 000 turns to INACTIVE, buffer 000 will be configured with a parameter, "lifetime". Here, in the present invention, "lifetime" means how long the buffer will be in the state of INACTIVE. In fact, "lifetime" is the life of the inactive buffer. As for an inactive buffer, its lifetime decreases by a predetermined value td each time when a timer corresponding to this buffer expires. As described above, there is provided a timer 134 in streaming server 100. The timer starts when the buffer turns into the state of INACTIVE. When timer 134 expires, the lifetime of buffer 000 which is assumed to be in INACTIVE state decreases by a predetermined value. After that timer 134 restarts and counts again. When the lifetime decreases to 0, the inactive buffer will be free and can be used to fill a new section. On the other hand, if the VoD section in the inactive buffer is requested by any users during the lifetime, the buffer will be moved back to the state ACTIVE.

The lifetime of one buffer in the state of INACTIVE are calculated as follows.

In one preferred embodiment, one VoD file 201 is required by one end user, and the user will start from the beginning of the VoD file. Then section 010 of VoD file 201 is loaded to the memory pool 112 using buffer 000. At this moment, the concurrent user count is 1 and the user peak is 1. During the period when section 010 is being streamed by the first user, another two users also require section 010. Then currently the concurrent user count will increase to 3 and the user peak also increases to 3. Here, the lifetime of section 010 should be 0 when this section is loaded for the first time.

When all the three users leave section 010, the concurrent user count will decrease to 0 but the user peak still keeps as 3 to label the popular level of this content section. Then, according to the principle as described above, the state of buffer 000 containing section 010 should be moved from ACITVE to INACTIVE and the lifetime is calculated according to the user peak and an influence coefficient. This parameter, influence coefficient, is introduced here to address the situation that if section 010 of VoD file 201 is hot, the probability of following sections of the VoD file to be hot is also high.

To be specific, when the state of buffer 000 turns from ACTIVE to INACTIVE, the lifetime of buffer 000 is calculated according to formula (1):

$$t1 = tc + \text{PeakUser} * \text{influence coefficient} * ts \tag{1}$$

wherein t1 represents the lifetime of buffer 000, tc represents the current lifetime of the buffer 000, PeakUser is the total number of users requesting the file section 010 when the buffer 000 is in the state of ACTIVE, influence coefficient is the number of the sections following file section 010, ts is the interval to decrease t1.

Interval ts and td and are determined according to the size of the file section 010, the size of the memory pool 112 and the popularity of the content contained in the file section 010.

The lifetime of buffer 000 in the state of INACTIVE containing section 010 is managed by global timer 134. Timer 134 expires every interval ts. Whenever global timer ts times out, lifetime of each inactive buffer, for example, buffer 000, will decrease a predetermined value td, for example, "1". Timer td and interval ts are determined according to the size of the content section, the size of memory pool 112 and the popularity of the file section.

During the lifetime of buffer 000, that is, when buffer 000 is in the state of INACTIVE, if there are any user requests to stream section 010, the state of buffer 000 will be moved from INACTIVE to ACTIVE. At this moment, the lifetime pauses immediately and the value of lifetime will be saved and kept, meanwhile user peak will be recalculated from 0. When buffer 000 comes back to the state of INACTIVE again, the saved lifetime will be used as the current lifetime, which is used in formula (1). When the state of buffer 000 is changed from INACTIVE S200 to ACTIVE S100 and remains unchangeable during the buffer 000 being in ACTIVE S100 state.

During the lifetime of buffer 000, if no more user requires section 010 until the lifetime of buffer 000 decrease to 0, buffer 000 will be labeled as FREE but be still filled with section 010 until buffer 000 is refreshed with a new VoD section. In this manner, a VoD section can exist in the server memory pool 112 as long as the server memory pool is not fully occupied. It is advantaged in that the reuse of the VoD section is therefore prolonged in the application. Therefore, if any user will request section 010 later, this section needn't to be reloaded from content storage 200. As a result, the repeatable disk I/O is avoided.

According to the above embodiment, when the state of buffer 000 storing file section 010 is changed from ACTIVE S100 to INACTIVE S200, the lifetime of one referred buffer, such as 00n storing referred file section 01n following the section 010, can also be calculated simultaneously in accordance with the following formula:

$$tln = tcn + \text{PeakUser} * (\text{influence coefficient} - n) * ts \tag{2}$$

wherein t1n represents the lifetime of the referred buffer, tcn represents the current lifetime of the referred buffer, n is the distance between the file section 010 and the referred file section, wherein 0<n<influence coefficient−1.

Parameter tln, which refers to the lifetime of buffer 00n containing content section 01n is calculated when the state of buffer 000 storing file section 010 is changed from ACTIVE S100 to INACTIVE S200. Lifetime tln of the referred buffer 00n will kept as the updated current lifetime tcn.

Figure 4:
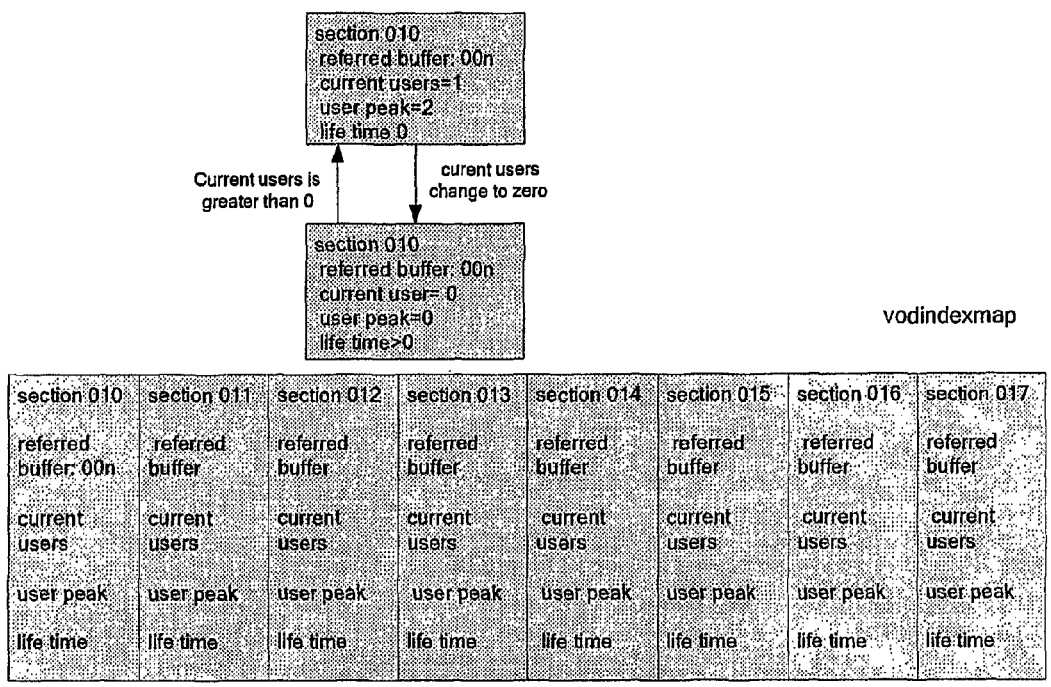
FIG. 4 is a block diagram relating to the forecasting mechanism for calculating the life time.

FIG. 4 shows an example of the calculation of the lifetime. When buffer 000 is in the state of ACTIVE S100, the current user counts one and user peak counts two. The current lifetime is zero. When the last user leaves section 010, the current user counts zero. At this time, lifetime of the buffer 000 will be calculated according to formula (1), with current lifetime being 0, user peak being 2 and predetermined influence coefficient and predetermined timeslot. Meanwhile, the lifetime of the following buffers, buffers 001 to 00n, is also calculated according to formula (2).

It should be understood that the one or more of First processing unit 301, second processing unit 302, determining unit 303, counter 304, generating unit 305 and timer Tscn 306 may comprise hardware, software, or any combination thereof. In at least one embodiment, these portions include instructions to carry out operations corresponding to the method steps as discussed above. Such instructions may be embodied as one or more computer programs comprising stored program instructions in a storage element (e.g., memory).

It should be appreciated that the present invention can be implemented as a computer readable medium including logic for managing buffers configured in a streaming server 100 in an on-Demand environment, wherein a plurality of buffers are allocated in a memory pool 112 of streaming server 100 to store sections of on-Demand files 201, the logic operable to: set the state of a buffer 000 to be ACTIVE S100 when a file section 010 stored in the buffer 000 is requested by any users; set the state of the buffer 000 to be INACTIVE S200 when users no longer request the file section 010 stored in the buffer 000, the buffer 000 in INACTIVE S200 state being configured with a lifetime t1; change the state of buffer 000 from INACTIVE S200 to FREE S300 when the lifetime t1 decreases to zero.

According to another embodiment of the invention, there is also provided a streaming server 100 for providing buffer management mechanism comprising a system as defined above.

According to another embodiment of the invention, there is further provided a communication system for providing on-Demand service over a communication network comprising a content storage 200 for storing on-Demand files and a streaming server 100 as depicted above.

Throughout the description and claims of this specification, the words "comprise", "include", and variations of the words, for example "comprising" and "comprises", means "including but not limited to", and is not intended to (and does not exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

It will be understood that the foregoing description of the embodiments of the invention has been presented for purposes of illustration and description. This description is not exhaustive and does not limit the claimed invention to the precise forms disclosed. Modifications and variations are possible in light of the above description or may be acquired from practicing the invention. The claims and their equivalents define the scope of the invention.

The invention claimed is:

1. A method for managing buffers configured in a streaming server in an on-Demand environment, wherein a plurality of buffers are allocated in a memory pool of the streaming server to store sections of on-Demand files, the method comprising:

setting a state of a buffer to be ACTIVE when a file section stored in the buffer is requested by any users;

setting the state of the buffer to be INACTIVE when users no longer request the file section stored in the buffer, the buffer in INACTIVE state having a lifetime, the lifetime of the buffer being determined when the state of the buffer is changed from ACTIVE to INACTIVE, the lifetime of the buffer being calculated based on at least a total number of users requesting the file section when the buffer is in the state of ACTIVE and an influence coefficient comprising a number of sections following the file section;

changing the state of the buffer from INACTIVE to FREE when the lifetime decreases to zero, and wherein the lifetime of the buffer storing the file section of the on-Demand file is determined as follows:

$$tl = tc + PeakUser * \text{influence coefficient} * ts$$

wherein tl represents the lifetime of the buffer, tc represents a current lifetime of the buffer, PeakUser is the total number of users requesting the file section when the buffer is in the state of ACTIVE and ts is an interval to decrease tl.

2. The method as defined in claim 1, wherein the file section in the buffer is not releasable when the buffer is in a state of ACTIVE or INACTIVE, and the file section in the buffer is releasable when the buffer is in a state of FREE.

3. The method as defined in claim 1, wherein the buffer in INACTIVE state can be recalled by any users requesting the file section stored in the buffer; and the buffer in FREE state can be refilled with any file sections when being requested.

4. The method as defined in claim 1, wherein the lifetime pauses immediately when the state of the buffer is changed from INACTIVE to ACTIVE and remains unchangeable during the buffer being in ACTIVE state.

5. The method as defined in claim 1, wherein the lifetime decreases by a predetermined time td per interval ts during the buffer being in INACTIVE state.

6. The method as defined in claim 5, wherein time td and the interval ts are determined according to a size of the file section, a size of the memory pool and a popularity of the content contained in the file section.

7. The method as defined in claim 1, wherein the lifetime of one referred buffer storing one referred file section following the section in the on-Demand file is determined according to the following formula at the time when the state of the buffer storing the file section is changed from ACTIVE to INACTIVE, $$tln = tcn + PeakUser * (\text{influence coefficient} - n) * ts$$

wherein tln represents the lifetime of the referred buffer, tcn represents the current lifetime of the referred buffer, n is the distance between the file section and the referred file section, wherein 0<n<influence coefficient−1.

8. The method as defined in claim 7, wherein the lifetime tln of the referred buffer is added to the current lifetime tcn when the state of the referred buffer is changed from ACTIVE to INACTIVE.

9. The method as defined in claim 1, wherein the value of PeakUser is set to be zero when the state of the buffer is changed from ACTIVE to INACTIVE.

10. The method as defined in claim 1, wherein the lifetime of the buffer is assigned to tc when the state of the buffer is changed from INACTIVE to ACTIVE.

11. A non-transitory computer-readable medium including logic for managing buffers configured in a streaming server in an on-Demand environment, wherein a plurality of buffers are allocated in a memory pool of the streaming server to store sections of on-Demand files, the logic configured to be executed by a computer to:

set the state of a buffer to be ACTIVE when a file section stored in the buffer is requested by any users;

set the state of the buffer to be INACTIVE when users no longer request the file section stored in the buffer, the buffer in INACTIVE state being configured with a lifetime, the lifetime of the buffer being determined when the state of the buffer is changed from ACTIVE TO INACTIVE, the lifetime of the buffer being calculated based on at least a total number of users requesting the file section when the buffer is in the state of ACTIVE and an influence coefficient comprising a number of sections following the file section;

change the state of the buffer from INACTIVE to FREE when the lifetime decreases to zero, and wherein the lifetime of the buffer storing the file section of the on-Demand file is determined as follows:

$$tl = tc + PeakUser * \text{influence coefficient} * ts$$

wherein tl represents the lifetime of the buffer, tc represents a current lifetime of the buffer, PeakUser is the total number of users requesting the file section when the buffer is in the state of ACTIVE and ts is an interval to decrease tl.

12. The system as defined in claim 11, wherein a buffer data information memory is configured in each buffer to keep information about a value of current users as well as the lifetime of buffer in INACTIVE state, the value of the current users being detected by the detector when the detector detects the total number of the users requesting the file section stored in the buffer.

13. The system as defined in claim 11, wherein the processor determines that the file section in the buffer is not releasable if the buffer is in a state of ACTIVE or INACTIVE, and the processor determines that the file section in the buffer is releasable if the buffer is in a state of FREE.

14. The system as defined in claim 11, wherein the processor determines that the buffer in INACTIVE state can be recalled by any users requesting the file section stored in this buffer; and the processor determines the buffer in FREE state can be refilled with any file sections when being requested.

15. The system as defined in claim 11, wherein the lifetime pauses immediately when the state setting unit changes the state of this buffer from INACTIVE to ACTIVE and the state of this buffer remains unchangeable during the buffer being in ACTIVE state.

16. The system as defined in claim 11, further comprising a timer connected with the memory pool for the purpose of decreasing the lifetime by a predetermined time td per interval ts during the buffer being in INACTIVE state.

17. The system as defined in claim 16, wherein the processor determines time td and the interval ts according to a size of the file section, a size of the memory pool and a popularity of the content contained in the file section.

18. The system as defined in claim 11, wherein the processor determines the lifetime of one referred buffer storing one referred file section following the section in the on-Demand file according to the following formula at the time when the state setting unit changes the state of the buffer storing the file section from ACTIVE to INACTIVE, $$tln = tcn + \text{PeakUser}*(\text{influence coefficient} - n)*ts$$

wherein tln represents the lifetime of the referred buffer, tcn represents the current lifetime of the referred buffer, n is the distance between the file section and the referred file section, wherein $0 < n <$ influence coefficient$-1$.

19. The system as defined in claim 18, wherein the current lifetime tc0 is zero when the state setting unit changes the state of the buffer from ACTIVE to INACTIVE for the first time.

20. The system as defined in claim 11, wherein the value of PeakUser decreases to zero when the state setting unit changes the state of the buffer from ACTIVE to INACTIVE.

21. The system as defined in claim 11, wherein the processor assigns the lifetime of the buffer to tc when the state setting unit changes the state of the buffer from INACTIVE to ACTIVE.

\* \* \* \* \*